United States Patent [19]

Koike

[11] Patent Number: 4,709,286
[45] Date of Patent: Nov. 24, 1987

[54] SUPPORTING MEANS FOR SUPPORTING A MAGNETIC TRANSDUCER FOR A DOUBLE SURFACE TYPE FLEXIBLE DISK APPARATUS

[75] Inventor: Kazuo Koike, Koriyama, Japan

[73] Assignee: Mitsubishi Denki Kabushiki Kaisha, Tokyo, Japan

[21] Appl. No.: 829,074

[22] Filed: Feb. 13, 1986

[30] Foreign Application Priority Data

Jun. 11, 1985 [JP] Japan .................................. 60-126664
Jun. 11, 1985 [JP] Japan .................................. 60-126665
Jun. 13, 1985 [JP] Japan .................................. 60-128673
Jun. 14, 1985 [JP] Japan .................................. 60-129507

[51] Int. Cl.$^4$ ........................ G11B 5/54; G11B 5/016
[52] U.S. Cl. ...................................... 360/105; 360/99
[58] Field of Search ............... 360/105, 106, 107, 97, 360/99

[56] References Cited

U.S. PATENT DOCUMENTS 3,946,439  3/1976  Castrodale et al. ................. 360/105
4,603,364  7/1986  Tronzano et al. ................... 360/105

FOREIGN PATENT DOCUMENTS

0067346A1  12/1982  European Pat. Off. .
0143443A2   6/1985  European Pat. Off. .
2602446C3   2/1981  Fed. Rep. of Germany .
3049955A1   3/1982  Fed. Rep. of Germany .

OTHER PUBLICATIONS

IBM Technical Disclosure Bulletin, vol. 18, No. 9, Feb. 1976, pp. 3018-3019.

Primary Examiner—John H. Wolff
Attorney, Agent, or Firm—Oblon, Fisher, Spivak, McClelland, & Maier

[57] ABSTRACT

A support for a transducer for a double surface type flexible disk apparatus includes an arm for holding a first magnetic transducer, a turnable lever placed near the arm and having two elongated ends whose one end is brought into contact with a part of the arm, a turnable lever position determining member which is adapted to be in contact with the other end of the turnable lever to control the position of the turnable lever and a spring wound on the turnable lever to cause the revolution of the same in one direction.

11 Claims, 13 Drawing Figures

SUPPORTING MEANS FOR SUPPORTING A MAGNETIC TRANSDUCER FOR A DOUBLE SURFACE TYPE FLEXIBLE DISK APPARATUS

The present invention relates to a double surface type flexible disk apparatus. More particularly, it relates to an improvement in a supporting means for moving a magnetic transducer between a non-operating position and an operating position where data are written in or read out, in a double surface type flexible disk apparatus.

FIGS. 12 and 13 show a conventional magnetic transducer supporting means for a double surface type flexible disk apparatus, wherein a reference numeral 1 designates a carriage movable on guide rails in the radial direction of a flexible recording medium 9, a numeral 3 designates a gimbal spring bonded with an adhesive at a position near the forwarding end of the carriage, a numeral 2 designates a first magnetic transducer mounted at the center of the gimbal spring, a numeral 5 designates a head cover which prevents the end of the recording medium 9 from striking the first magnetic transducer 2 when it is inserted in the flexible disk apparatus and a numeral 6 designates a second magnetic transducer which is mounted at the center of a gimbal spring 7 at a position opposing the first magnetic transducer, the gimbal spring 7 being fixed at the top end of an arm 11 by an adhesive agent. A reference numeral 12 designates a plate spring for supporting the arm 11. An end of the plate spring 12 is connected to the carriage by a screw 8 and so on and the other end is connected to the arm 11 by insert-molding. A reference numeral 13 designates a coil spring interposed between the arm 11 and a supporting plate 15 to push the second magnetic transducer 6 toward the recording medium 9, a numeral 10 designates a supporting table which controls the position of the arm 11 so that a force more than required is not applied to the recording medium 9 when the second magnetic transducer 6 is pressed to the recording medium 9 by the coil spring 13, and a numeral 16 designates a veil for a solenoid which moves the second magnetic transducer 6 away from the recording medium.

The operation and function of the conventional supporting means will be described.

FIG. 13 shows a head-unload state in which the arm 11 is lifted by the upward movement of the veil 16 of the solenoid (not shown) and the second magnetic transducer 6 is slightly away from the recording medium 9 to become non-contact state.

When the recording medium 9 is to be inserted or removed, the arm 11 is further brought upward by the action of the bridge means (not shown) so that the second magnetic transducer 6 is further away from the recording medium 9 from the head-unload state. Accordingly, the recording medium 9 can be inserted and removed without any contact with the second magnetic transducer 6. In this case, the first transducer 2 is supported by a pivot 4, and a head cover 5 is provided above a pivot 4 and slightly lower than the first magnetic transducer 2. With the arrangement of the head cover 5 and the first magnetic transducer 2, the recording medium 9 is moved while in contact with the top surface of the first magnetic transducer 2 when the recording medium 9 is inserted or removed.

When data are to be written in or read out, the recording medium 9 is brought into the flexible disk apparatus and at the same time the bridge means is lowered. Then, a solenoid magnet is actuated to lower the veil 16, whereby the arm 11 is pushed toward the recording medium 9 by the action of the coil spring 13 until the arm is received by the supporting table 10. Finally, the second magnetic transducer 6 comes in press-contact with the recording medium 9 to be ready for writing and reading operations.

In the conventional magnetic transducer supporting means for a double surface type flexible disk apparatus having the above-mentioned construction, it is necessary to provide the head cover 5 to avoid impinging of the first magnetic transducer 2 to the recording medium 9 when it is inserted into or removed from the flexible disk apparatus. This causes increase in a manufacturing cost. Further, an amount of projection of the first magnetic transducer 2 from the top surface of the head cover 5 gives delicate influence to a contacting point of the first magnetic transducer 2 to the recording medium when it is inserted, and adverse affect is given to a pressing force by the first and second magnetic transducers when the data is written in or read out. Accordingly, a sufficient control of the distance between these elements is needed and processability becomes poor.

It is an object of the present invention to eliminate the above-mentioned problems and to provide a magnetic transducer supporting means for a double surface type flexible disk apparatus which eliminates a head cover 5 and improves processability by avoiding contact between the first magnetic transducer 2 to the recording medium 9 when the recording medium 9 is inserted or removed.

The foregoing and the other objects of the present invention have been attained by providing a supporting means for supporting a transducer for a double surface type flexible disk apparatus of a type that when data are written in or read out, first and second magnetic transducers opposed to each other are respectively brought in press-contact with the both surfaces of a flexible recording medium, characterized by comprising an arm for holding the first magnetic transducer, a turnable lever placed near the arm and having two elongated ends whose one end is brought into contact with a part of the arm, a turnable lever position determining member which is adapted to be in contact with the other end of the turnable lever to control the position of the turnable lever, and a spring wound on the turnable lever to cause the revolution of the same in one direction.

Figure 12:
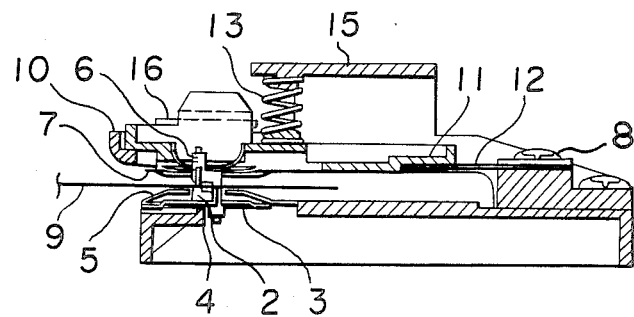
FIG. 12 is a longitudinal cross-sectional view of a conventional magnetic transducer supporting means.
Figure 13:
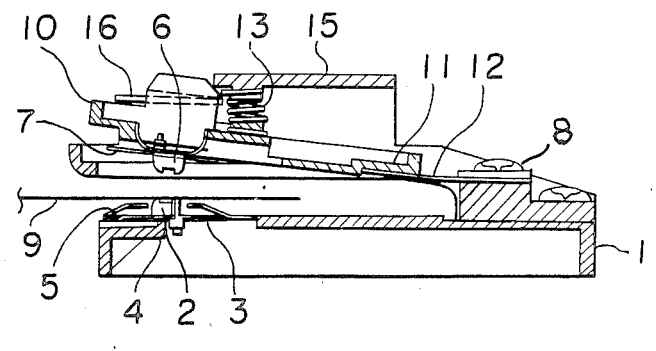
FIG. 13 is a longitudinal cross-sectional view, similar to FIG. 12, showing a state of operation.

The first embodiment of the present invention will be described with reference to FIGS. 1, 2, 9, 10 and 11. In the Figures, the same reference numerals as in FIGS. 12 and 13 designate the same or corresponding parts, and therefore description of these parts is omitted.

A first arm 24 for holding the first magnetic transducer 2 is firmly connected to the carriage 1 through a plate spring 25. A coil spring 26 is interposed between the first arm 24 and a supporting plate 27 to press the first arm 24, i.e. the first magnetic transducer 2 toward the recording medium 9. An L-shaped lever 17 is formed integrally with the first arm 24 and extends downwardly from the same. A turnable lever 18 is placed near a side of the arm 24 and is pivoted by a guide rod 19 so as to be turnable around the axial center of the rod 19 by means of a torsion spring 22 wound on the turnable lever 18. The turnable lever 18 is provided with two elongated portions and one end of which is engageable with the L-shaped lever 17. By the spring action of the torsion spring 22, the turnable lever 18 is forced in the clockwise direction so that the one end of the turnable lever 18 is engaged with the L-shaped lever 17. A frame 23 receives one end of the torsion spring 22. A rod-like piece 21 is fitted to a bridge 20 so that the lower end of it is brought to contact with the other end of the turnable lever 18.

The operation and function of the first embodiment of the present invention will be described.

Figure 1:
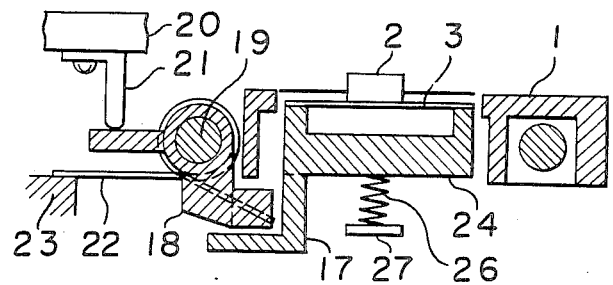
FIG. 1 is a cross-sectional view of an embodiment of the supporting means for supporting a first magnetic transducer for a double surface type flexible disk apparatus of the present invention.
Figure 2:
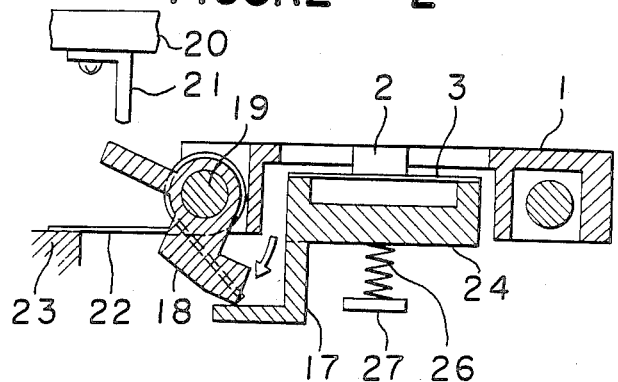
FIG. 2 is a cross-sectional view similar to FIG. 1, showing a state of operation.
Figure 3:
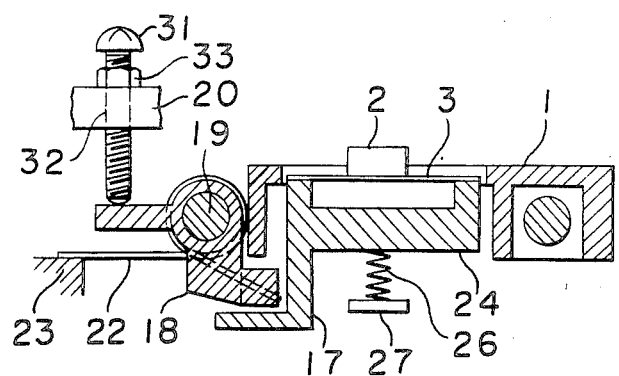
FIG. 3 is a cross-sectional view of a second embodiment of the present invention.
Figure 4:
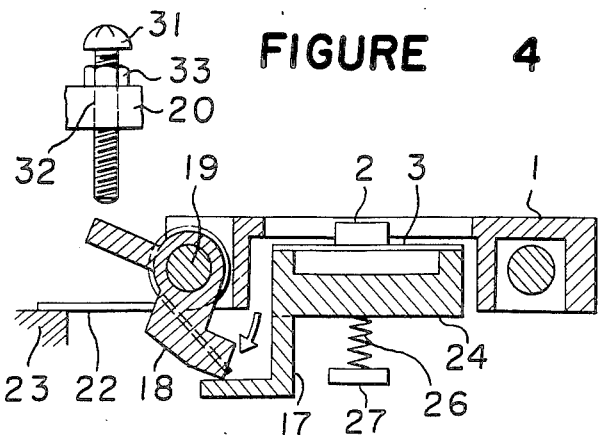
FIG. 4 is a cross-sectional view, similar to FIG. 3, showing a state of operation.
Figure 10:
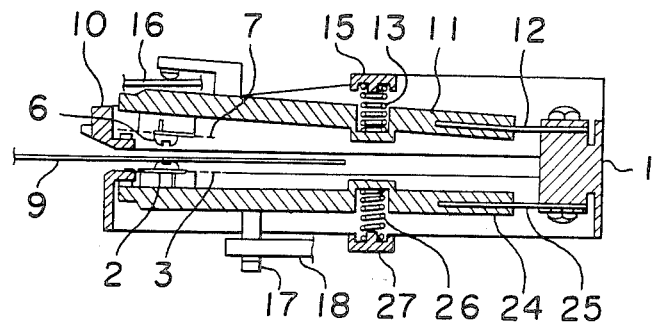
Figure 11:
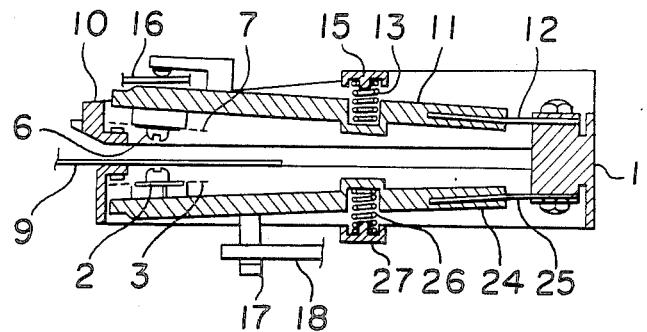

As shown in FIGS. 1 and 10, the upper arm 11 is lifted by the upward movement of the veil 16 for the solenoid magnet (not shown) when the flexible disk apparatus is not operated for writing in or reading out of the data, whereby the second magnetic transducer 6 is away from the recording medium 9. In this case, the first arm 24, namely, the lower arm is not moved and the first magnetic transducer 2 is in contact with the recording medium 9 being subjected to revolution. Accordingly, they are in non-pressing state since the second magnetic transducer 6 is separated from the recording medium 9. As a result, wearing of the recording medium 9 is minimized.

When the recording medium 9 is to be inserted or removed, the upper arm 11 is further raised by a bridge means (not shown), whereby the second magnetic transducer 6 is further away from the recording medium 9. The rodlike piece 21 is also raised by the opening operation of the bridge 20, and the turnable lever 18 is turned in the arrow mark direction by the action of the torsion spring 22. As a result, the lower arm 24 is lowered. Accordingly, the first magnetic transducer 2 is separated from the recording medium 9, and the recording medium 9 can be inserted or removed without any contact with the first and second magnetic transducers 2 and 6.

When recording or reading of the data is to be carried out, the recording medium 9 is inserted and the bridge 20 is lowered. On the other hand, the veil 16 is also lowered by the attractive force of the solenoid, whereby the upper arm 11 is downwardly turned toward the recording medium 9 by the pushing force of the coil spring 13 until it is received by the supporting table 10.

Figure 9:
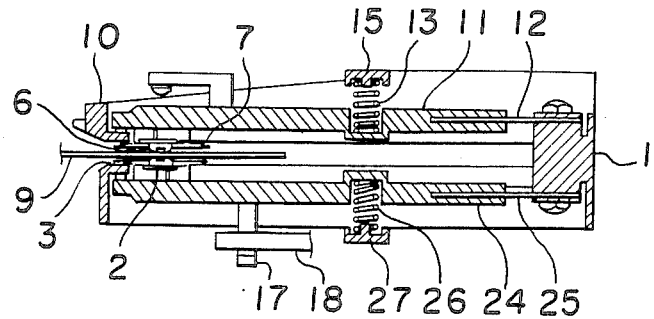
FIGS. 9, 10 and 11 are longitudinal cross-sectional views in which an arm is connected to a carriage and holds the first and second magnetic transducers between which a flexible disk is inserted, the views showing three steps in operation of the magnetic transducer holding means of the present invention.

At the moment, the bridge 20 is lowered, hence the rod-like piece 21 is lowered to cause turning of the turnable lever 18, whereby engagement of the one end of the turnable lever 18 with the L-shaped lever 17 is released. Accordingly, the first arm, i.e. the lower arm 24 is pushed by the coil spring 26 toward the recording medium 9 until it is received by the top end of the carriage 1. The quantity of flexibility of the gimbal springs 3, 7 is determined depending on the distance between the supporting table 10 and the front end of the carriage. A spring force given by the quantity of deflection pushes the first and second magnetic transducers 2, 6 to the recording medium 9 from both sides to thereby bring them in contact with the recording medium; thus the writing-in or reading-out operations can be carried out as shown in FIG. 9.

The second embodiment of the present invention will be described with reference to FIGS. 3, 4, 9, 10 and 11.

The second embodiment is the same as the first embodiment except that an adjusting screw 31 is used instead of the rod-like piece 21. The adjusting screw 31 is fastened to a threaded hole 32 formed in the bridge 20, and the position of the adjusting screw 31 is determined by a lock nut 33.

In the second embodiment, a distance of depression of the first arm 24, i.e. the first magnetic transducer 2 with respect to the recording medium 9 can be determined as desired by adjusting the length of the adjusting screw by means of the lock nut 33.

The third embodiment of the present invention will be described with reference to FIGS. 5, 6, 9, 10 and 11.

The third embodiment of the present invention has the same construction as the first and second embodiments provided that a knob lever shaft 40 and cam 41 are used as a turnable lever position determining member instead of a rod-like piece or the adjusting screw as shown in FIGS. 1 to 4.

The cam 41 is arranged at such a position that the free end of it comes in contact with a part of the turnable lever 18, and the cam 41 is firmly attached to the knob lever shaft 40.

Figure 6:
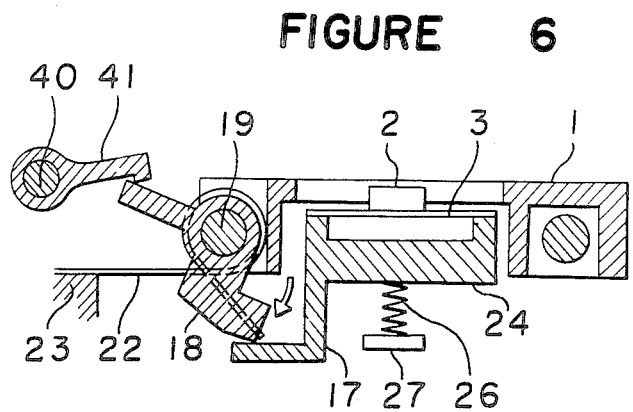
FIG. 6 is a cross-sectional view, similar to FIG. 5, showing a state of operation.
Figure 7:
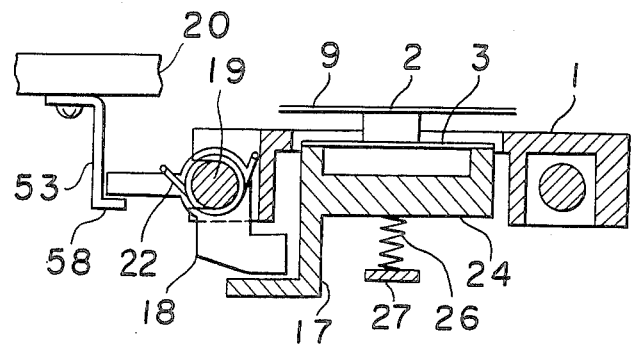
FIG. 7 is a cross-sectional view of the fourth embodiment of the present inventon.

In the operation of the third embodiment, when the recording medium 9 is inserted in or removed from the flexible disk apparatus, the knob lever shaft 40 is turned counterclockwisely so that the cam 41 is turned along with the shaft 40 as shown in FIG. 6. Accordingly, the turnable lever 18 is turned in the arrow mark direction by the action of the torsion spring 22 with the consequent of lowering the first arm 24 whereby the first magnetic transducer 2 is separated from the recording medium 9. It is therefore possible to insert and remove the recording medium 9 without contact with the magnetic transducers 2, 6.

Figure 5:
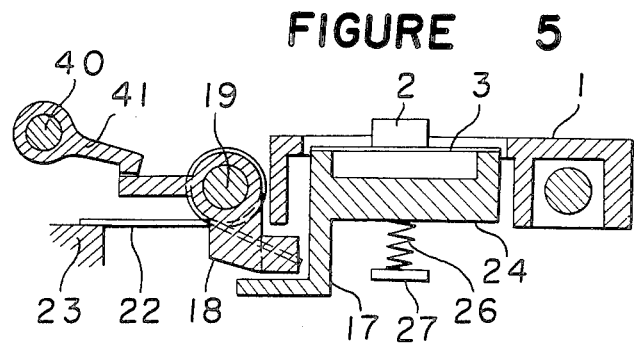
FIG. 5 is a cross-sectional view of the third embodiment of the present invention.

When data are written in or read out, the knob lever shaft 40 is clockwisely turned to cause rotation of the cam 41 in the same direction. Accordingly, the turnable lever 18 is turned to a position as shown in FIG. 5 since the free end of the cam 41 is in contact with the L-shaped lever 17 of the turnable lever 18. Accordingly, the first arm 24 which is in a free state is pushed toward the recording medium 9 by the action of the coil spring 26, whereby the first magnetic transducer 2 is brought into contact with the recording medium 9, and at the same time the second magnetic transducer 6 is also brought into contact with the recording medium 9 from the opposing side; thus recording or reading operation can be carried out.

In the third embodiment of the present invention, use of the cam 41 to operate the first arm 24 through the turnable lever 18 requires only small rotating force.

The fourth embodiment of the present invention will be described with reference to FIGS. 7, 8, 9, 10 and 11.

The construction of the fourth embodiment is the same as those of the first to third embodiments provided that an engaging piece 53 having a curved end portion 58 is placed at a position where it is brought into contact with the other end portion of the turnable lever 18, the engaging piece 53 being firmly attached to the bridge 20 or the knob lever shaft 40 to cause rotation of the turnable lever 18 when the bridge 20 is vertically moved. In the Figures, the same reference numerals as in FIGS. 1 to 6 designate the same or corresponding parts, and therefore description of these parts is omitted.

The operation of the fourth embodiment of the present invention is as follows.

Figure 8:
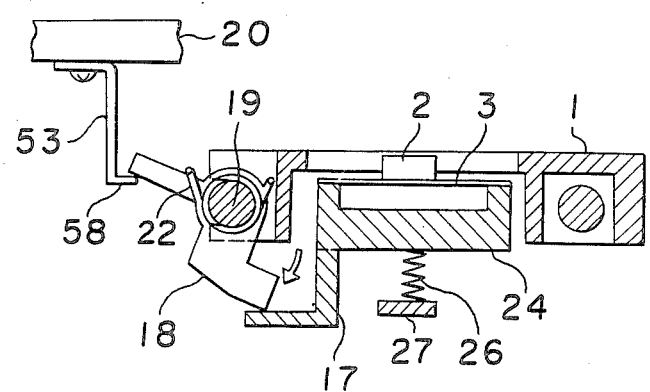
FIG. 8 is a cross-sectonal view, similar to FIG. 7, showing a state of operation.

When the recording medium 9 is to be inserted in or removed from the flexible disk apparatus, the upper arm 11 is raised from the recording medium 9 and the bridge 20 is opened, whereby the engaging piece 53 is lifted up as shown in FIG. 8. Then, the turnable lever 18 is turned in the arrow mark direction against the action of the torsion spring 22. The turning operation of the turnable lever 18 lowers the first arm 24 since the one end of the turnable lever 18 is engageable with the L-shaped lever 17 formed integrally with the first arm 24. Accordingly, the first magnetic transducer 2 is away from the recording medium 9. Then, the recording medium 9 can be inserted or removed without contact with the magnetic transducers 2, 6.

When data is to be written in or read out, the recording medium is inserted and the bridge 20 is lowered together with the engaging piece 53 until the end of the upper arm 11 is received by the supporting table 10. Then, the turnable lever 18 is turned by the torsion spring 22, whereby the engagement of the one end of the turnable lever 18 with the L-shaped lever 17 is released. Then, the first arm 24 is pushed up to the recording medium 9 by the action of the coil spring 26 until the first arm 24 is received by the top end of the carriage 1. The quantity of flexure of the gimbal springs 3, 7 is determined by the distance between the supporting table 10 and the top end of the carriage, and a spring pressure produced by the flexure of the gimbal springs brings the first and second magnetic transducers 2, 6 into press-contact with the recording medium 9 from both sides as shown in FIG. 9; thus the recording and reading operations can be carried out.

In accordance with the present invention, construction is made so as not to bring the first magnetic transducer 2 in contact with the recording medium 9 at the time of inserting or removing the recording medium 9. Accordingly, a head cover used in the conventional apparatus becomes useless with the result that it is unnecessary to adjust the first magnetic transducer 2 to be projected from the head cover 5. Construction of the supporting means according to the present invention improves efficiency of operations and products having high quality can be provided.

In the above-mentioned embodiments, description has been made as to use of a gimbal spring for supporting the first magnetic transducer 2; however, it is possible to use a pivot 4 to support the first magnetic transducer 2 from the back side.

In the above-mentioned embodiments, the supporting table 10 is provided to receive the arm 11. However, the same effect as the table 10 can be obtained by using an appropriate means instead of the supporting table 10.

I claim:

1. A double surface type flexible disk apparatus comprising:
    (a) a carriage;
    (b) a first arm flexibly mounted on said carriage;
    (c) a second arm flexibly mounted on said carriage and extending generally parallel to and in opposition to said first arm;
    (d) first means for biasing said first arm toward said second arm;
    (e) second means for biasing said second arm toward said first arm;
    (f) a first magnetic transducer mounted on said first arm;
    (g) a second magnetic transducer mounted on said second arm in opposition to said first magnetic transducer;
    (h) a guide rod having an axis extending perpendicularly to the direction of motion of said first arm;
    (i) a lever mounted on said guide rod and having a first end and a second end, both of which extend outwardly from said guide rod, said lever being rotatable about the axis of said guide rod between a first position in which it does not contact said first arm and a second position in which it has contacted said first arm and moved it away from said second arm against the bias of said first means;
    (j) third means for biasing said first end of said lever toward said first arm, said third means being more powerful than said first means;
    (k) a bridge movable between a first position and a second position in a direction at least generally parallel to the direction of motion of said first arm; and
    (l) a rod-like piece mounted on said bridge, said rod-like piece being sized, shaped, and positioned so that:
        (i) when said bridge is in its first position, said rod-like piece contacts said second end of said lever and prevents said third means from moving said lever from its first position to its second position and,
        (ii) when said bridge is in its second position, said rod-like piece permits said third means to cause said lever to move from its first position to its second position, thereby moving said first arm away from said second arm.

2. A double surface type flexible disk apparatus as recited in claim 1 wherein said lever is rotatable relative to said guide rod.

3. A double surface type flexible apparatus as recited in claim 1 wherein, when said bridge is in its second position, said rod-like piece does not contact said second end of said lever.

4. A double surface type flexible disk apparatus comprising:
    (a) a carriage;
    (b) a first arm flexibly mounted on said carriage;
    (c) a second arm flexibly mounted on said carriage and extending generally parallel to and in opposition to said first arm;

(d) first means for biasing said first arm toward said second arm;
(e) second means for biasing said second arm toward said first arm;
(f) a first magnetic transducer mounted on said first arm;
(g) a second magnetic transducer mounted on said second arm in opposition to said first magnetic transducer;
(h) a guide rod having an axis extending perpendicularly to the direction of motion of said first arm;
(i) a lever mounted on said guide rod and having a first end and a second end, both of which extend outwardly from said guide rod, said lever being rotatable about the axis of said guide rod between a first position in which it does not contact said first arm and a second position in which it has contacted said first arm and moved it away from said second arm against the bias of said first means;
(j) third means for biasing said first end of said lever toward said first arm, said third means being more powerful than said first means;
(k) a bridge movable between a first position and a second position in a direction at least generally parallel to the direction of motion of said first arm; and
(1) an adjusting screw threadedly mounted on said bridge, said adjusting screw being movable relative to said bridge and being sized, shaped, and positioned so that:
  (i) when said bridge is in its first position, said adjusting screw contacts said second end of said lever and prevents said third means from moving said lever from its first position to its second position and,
  (ii) when said bridge is in its second position, said adjusting screw permits said third means to cause said lever to move from its first position to its second position, thereby moving said first arm away from said second arm.

5. A double surface type flexible disk apparatus as recited in claim 4 wherein said lever is rotatable relative to said guide rod.

6. A double surface type flexible disk apparatus as recited in claim 4 wherein, when said bridge is in its second position, said adjusting screw does not contact said second end of said lever.

7. A double surface type flexible disk apparatus comprising:
(a) a carriage;
(b) a first arm flexibly mounted on said carriage;
(c) a second arm flexibly mounted on said carriage and extending generally parallel to and in opposition to said first arm;
(d) first means for biasing said first arm toward said second arm;
(e) second means for biasing said second arm toward said first arm;
(f) a first magnetic transducer mounted on said first arm;
(g) a second magnetic transducer mounted on said second arm in opposition to said first magnetic transducer;
(h) a guide rod having an axis extending perpendicularly to the direction of motion of said first arm;
(i) a lever mounted on said guide rod and having a first end and a second end, both of which extend outwardly from said guide rod, said lever being rotatable about the axis of said guide rod between a first position in which it does not contact said first arm and a second position in which it has contacted said first arm and moved it away from said second arm against the bias of said first means;
(j) third means for biasing said first end of said lever toward said first arm, said third means being more powerful than said first means;
(k) a knob lever shaft having an axis extending at least generally parallel to the axis of said guide rod; and
(l) a cam mounted on said knob lever shaft, said cam being rotatable about the axis of said knob lever shaft between a first position and a second position, said cam being sized, shaped, and positioned so that:
  (i) when said cam is in its first position, said cam contacts said second end of said lever and prevents said third means from moving said lever from its first position to its second position and,
  (ii) when said cam is in its second position, said cam permits said third means to cause said lever to move from its first position to its second position, thereby moving said first arm away from said second arm.

8. A double surface type flexible disk apparatus as recited in claim 7 wherein said lever is rotatable relative to said guide rod.

9. A double surface type flexible disk apparatus as recited in claim 7 wherein, when said cam is in its second position, it contacts said second end of said lever.

10. A double surface type flexible disk apparatus comprising:
(a) a carriage;
(b) a first arm flexibly mounted on said carriage;
(c) a second arm flexibly mounted on said carriage and extending generally parallel to and in opposition to said first arm;
(d) first means for biasing said first arm toward said second arm;
(e) second means for biasing said second arm toward said first arm;
(f) a first magnetic transducer mounted on said first arm;
(g) a second magnetic transducer mounted on said second arm in opposition to said first magnetic transducer;
(h) a guide rod having an axis extending perpendicularly to the direction of motion of said first arm;
(i) a lever mounted on said guide rod and having a first end and a second end, both of which extend outwardly from said guide rod, said lever being rotatable about the axis of said guide rod between a first position in which it does not contact said first arm and a second position in which it has contacted said first arm and moved it away from said second arm against the bias of said first means;
(j) a bridge movable between a first position and a second position in a direction at least generally parallel to the direction of motion of said first arm;
(k) third means for biasing said first end of said lever away from said first arm; and
(l) an engaging piece mounted on said bridge and extending toward said second end of said lever, said engaging piece having a curved end portion extending along said second end of said lever on the side thereof away from said bridge, said engaging piece being sized, shaped, and positioned so that:

(i) when said bridge is in its first said engaging piece does not contact said second end of said lever;

(ii) when said bridge moves from its first position to its second position, said curved end portion of said engaging piece contacts said second end of said lever and moves said lever from its first position to its second position against the bias of said third means, thereby moving said first arm away from said second arm; and (iii) when said bridge moves from its second position to its first position, said lever moves from its second position to its first position due to the bias of said third means.

11. A double surface type flexible disk apparatus as recited in claim 10 wherein said lever is rotatable relative to said guide rod.

* * * * *